US010219526B2

(12) United States Patent
Ummadi et al.

(10) Patent No.: US 10,219,526 B2
(45) Date of Patent: Mar. 5, 2019

(54) FROZEN AERATED PRODUCTS

(71) Applicant: NESTEC S.A., Vevey (CH)

(72) Inventors: Madhavi Ummadi, Bakersfield, CA (US); Madansinh Vaghela, Bakersfield, CA (US); Aaron Beth Butterworth, Bakersfield, CA (US); Nirav Chandrakant Pandya, Bakersfield, CA (US); Bridgett Lynn McCune, Bakersfield, CA (US); Christophe Joseph Etienne Schmitt, Servion (CH)

(73) Assignee: Nestec S.A., Vevey (CH)

( * ) Notice: Subject to any disclaimer, the term of this patent is extended or adjusted under 35 U.S.C. 154(b) by 216 days.

(21) Appl. No.: 14/512,006

(22) Filed: Oct. 10, 2014

(65) Prior Publication Data

US 2015/0099050 A1    Apr. 9, 2015

Related U.S. Application Data

(63) Continuation of application No. 13/148,360, filed as application No. PCT/EP2010/051669 on Feb. 11, 2010, now Pat. No. 8,936,821.

(Continued)

(51) Int. Cl.
*A23G 9/28* (2006.01)
*A23G 9/38* (2006.01)
(Continued)

(52) U.S. Cl.
CPC ............... *A23G 9/38* (2013.01); *A23G 9/04* (2013.01); *A23G 9/20* (2013.01); *A23G 9/40* (2013.01);
(Continued)

(58) Field of Classification Search
CPC ............ A23L 1/32; A23L 1/3056; A23G 9/38
(Continued)

(56) References Cited

U.S. PATENT DOCUMENTS 4,857,331 A    4/1989 Shaw et al.
4,855,156 A    8/1989 Singer et al.
(Continued)

FOREIGN PATENT DOCUMENTS

CN      1315834      10/2001
CN    101394752       3/2009
(Continued)

OTHER PUBLICATIONS

Cho et al Heat Induced interactions of b-lactoglobulinA and k-caseinB in a model system, pp. 61-71 Journal of Dairy research 2003.*
(Continued)

*Primary Examiner* — Jyoti Chawla
(74) *Attorney, Agent, or Firm* — K&L Gates LLP (57) ABSTRACT

The present invention relates to frozen aerated products including products manufactured by low-temperature extrusion with superior creaminess. In particular, the invention is concerned with a partially coagulated protein system induced by controlled coagulation of milk protein which imparts outstanding sensory attributes on frozen confectionery including low-temperature extruded frozen products, in particular when containing low fat. A method of producing such frozen aerated confectionery product and the products obtainable from the method are also part of the present invention.

20 Claims, 6 Drawing Sheets

Gel electrophoresis of total and soluble protein fractions

Related U.S. Application Data (60) Provisional application No. 61/152,629, filed on Feb. 13, 2009.

(51) Int. Cl.

| | | |
|---|---|---|
| *A23G 9/20* | (2006.01) | |
| *A23G 9/40* | (2006.01) | |
| *A23G 9/46* | (2006.01) | |
| *A23G 9/04* | (2006.01) | |
| *A23L 33/17* | (2016.01) | |
| *A23L 33/19* | (2016.01) | |
| *A23L 15/00* | (2016.01) | |

(52) U.S. Cl.
CPC ............... *A23G 9/46* (2013.01); *A23L 33/17* (2016.08); *A23L 33/19* (2016.08); *A23L 15/00* (2016.08); *A23V 2002/00* (2013.01)

(58) Field of Classification Search
USPC .......................................... 426/565, 100, 101
See application file for complete search history.

(56) References Cited

U.S. PATENT DOCUMENTS

| | | | |
|---|---|---|---|
| 5,215,777 A | 6/1993 | Asher et al. | |
| 5,350,590 A | 9/1994 | McCarthy et al. | |
| 5,714,182 A | 2/1998 | Bisson et al. | |
| 6,514,555 B1 | 2/2003 | Fayard et al. | |
| 6,596,333 B1 * | 7/2003 | Vaghela ................ | A23G 9/32 426/100 |
| 7,261,913 B2 | 8/2007 | Windhab et al. | |
| 2002/0031600 A1 | 3/2002 | Sato et al. | |
| 2007/0196553 A1 | 8/2007 | Windhab et al. | |

FOREIGN PATENT DOCUMENTS

| | | |
|---|---|---|
| EP | 0308091 | 3/1989 |
| EP | 0713650 | 5/1996 |
| EP | 1180329 | 2/2002 |
| EP | 1342418 | 9/2003 |
| EP | 1839495 | 10/2007 |
| GB | 195224 | 3/1923 |
| WO | 200001246 | 1/2000 |
| WO | 2005070255 | 8/2005 |
| WO | 2006099987 | 9/2006 |

OTHER PUBLICATIONS

PCT International Search Report for International Application No. PCT/EP2010/051669 with an International Filing Date of Nov. 2, 2010.

PCT Written Opinion of the International Searching Authority for International Application No. PCT/EP2010/051669 with an International Filing Date of Nov. 2, 2010.

Marshall et al., 2000, pp. 48-49 and 78-79.

European Office Action for Application No. 10705124.5-1358, dated Sep. 21, 2016, 9 pages.

European Patent Office Communication issued in related Application No. 10705124.5-1358 / 2395852 dated Jul. 13, 2017, 12 pages.

Berkshire Dairy Spec Sheet "Condensed Skim Milk-Low Heat" printed from the Internet at http://www.berkshiredairy.com/uploads/spec_sheets/condensed_skim_milk_low_heat.pdf, 2 pages.

Office Action issued in related Mexican Patent Application No. MX/a/2014/015524 dated Apr. 3, 2017. 7 pages.

Douglas Hoff et al. "Ice cream", Springer, Jan. 2009.

* cited by examiner

Figure 6 Gel electrophoresis of total and soluble protein fractions

FROZEN AERATED PRODUCTS

PRIORITY CLAIM

This application is a continuation of U.S. patent application Ser. No. 13/148,360, filed Aug. 8, 2011, which is a National Stage of International Application No. PCT/EP10/051669, filed on Feb. 11, 2010, which claims priority to U.S. Provisional Application No. 61/152,629, filed on Feb. 13, 2009, the entire contents of which are being incorporated herein by reference.

FIELD OF THE INVENTION

The present invention relates to frozen aerated products. In particular, the invention is concerned with frozen confections comprising a partially coagulated protein system which contributes to the improvement of textural and sensorial attributes of the confections, in particular of products based on lower fat formulations. Such a protein system is used according to the invention in frozen confection prepared by conventional freezing alone or combined with low temperature freezing wherein it improves the microstructure and stability on frozen products. A method of producing such frozen aerated confectionery products and the products obtainable from the method are also part of the present invention.

BACKGROUND OF THE INVENTION

Many technical routes have been explored in the prior art to improve the sensorial properties of low fat formulations used for the preparation of ice confections.

Low-temperature extrusion or low-temperature freezing is a technology that has been recently developed and which has been used to confer enhanced organoleptic properties to frozen confectionery products. Examples of such frozen confectioneries include ice cream, frozen yogurt, sorbet etc.

Such a method is described for instance in a general way in the following published documents: WO 2005/070225, WO 2006/099987, EP 0713650, U.S. Pat. No. 7,261,913 and more recently US 2007-0196553.

The products obtained by low-temperature extrusion have a particular microstructure as extensively described in Ph.D. Dissertation of Wildmoser J. submitted to the Swiss Federal Institute of Technology of Zürich in 2004, "Impact of Low Temperature Extrusion Processing on Disperse Microstructure in Ice Cream Systems".

Low temperature extrusion is used in the manufacturing of reduced and low fat frozen confectioneries wherein this technology is helping to compensate for the effect of a low fat content on the texture and mouthfeel of the product.

The prior art also discloses ways to improve the texture of low fat ice confection products prepared by conventional freezing through the use of specific emulsifiers. However, these additives are often perceived negatively by the consumer and solutions that get rid of such ingredients are highly sought.

Besides, consumers' demand continuously increases for "better for you" types of products with lower fat contents or even non fat products, while not compromising on taste. There is therefore a need to improve the results obtained here thereto and to improve the sensory profile of existing products.

SUMMARY OF THE INVENTION

The present invention now solves the foregoing problems by providing a stable frozen confectionery product having enhanced or improved organoleptic properties.

In a first aspect, the invention relates to a frozen aerated confectionery product comprising a partially coagulated protein system including kappa-casein and beta-lactoglobulin, said product having a pH comprised between 5.6 and 6.3, preferably between 5.8 and 6.3 when melted and centrifuged at 50,000 g for 30 min and measured at 25° C.

Preferably, the product of the invention is characterised by a content of soluble protein below or equal to 60%, a ratio of soluble kappa-casein to total content of kappa-casein below or equal to 0.12 and a ratio of soluble beta-lactoglobulin to total content of beta-lactoglobulin below or equal to 0.57.

In a second aspect, the present invention relates to a product as defined above which is low temperature extruded.

The products of the invention present excellent organoleptic properties, in particular in terms of texture and mouthfeel even when very low levels of fat are used. Besides, the products of the invention show good stability and can therefore advantageously allow avoiding the use of non-natural additives.

In a further aspect, the invention pertains to the use of a partially coagulated protein system comprising kappa-casein and beta-lactoglobulin for manufacturing a frozen confectionery product.

The invention also relates to a method of producing an aerated frozen confectionery product wherein controlled heat and acidic conditions are applied to an ice confection mix in such a way to provide a partially coagulated protein system within the mix that is further aerated and frozen, either by conventional freezing or by further low temperature extrusion.

More particularly, a method of producing an aerated frozen confectionery product comprising the steps of
 a) providing an ingredient mix with a pH comprised between 5.6 and 6.3, preferably between 5.8 and 6.3 comprising fat, preferably in an amount of 0-20% by weight, milk solids non-fat, preferably in an amount of 5-15%, a sweetening agent, preferably in an amount of 5-30%, a stabiliser system, preferably in an amount of 0 to 6%, and optionally an acidic component;
 b) homogenising the mix;
 c) pasteurising the mix preferably to a temperature comprised between 178° F. and 190° F. for 30 to 90 seconds;
 d) freezing while aerating the mix;
 e) optionally hardening the mix
and said method wherein step d) is followed by low temperature freezing are also objects of the present invention.

The products obtainable by these methods or the use mentioned above also form an embodiment of the present invention.

In the products of the invention, the partially coagulated protein system preferably includes milk proteins, caseins, whey proteins or mixtures thereof that have been coagulated by a heat treatment in a mild acidic environment e.g. through the presence of molasses or of an organic acid. More particularly, the partially coagulated protein system of the products of the invention includes kappa-casein and beta-lactoglobulin in the form of complexes or aggregates. The partially coagulated protein system is generally present in an amount sufficient to provide a smooth and creamy texture to the confectionery product to which it is added or in which it is formed without the use of non-natural stabilizers or other conventional artificial additives used for this purpose.

BRIEF DESCRIPTION OF THE DRAWINGS

The invention is further illustrated in the following figures, wherein:

FIGS. 1 to 4 are graphs illustrating particle diameters wherein FIGS. 1 and 4 represent the prior art; and FIGS. 2 and 3 show the particle sizes of the coagulated protein systems of the present invention.

DETAILED DESCRIPTION OF THE INVENTION

In the following description, the % values are in wt % unless otherwise specified.

The invention pertains to frozen confectionery products which texture and mouthfeel is improved as a result of an optimized process of preparation including the controlled use of heat and acidic conditions.

In a first aspect, the invention relates to a frozen aerated confectionery product comprising a partially coagulated protein system including kappa-casein and beta-lactoglobulin, wherein said product has a pH comprised between 5.6 and 6.3, preferably between 5.8 and 6.3 when melted and centrifuged at 50,000 g for 30 min and measured at 25° C. Preferably, the product is characterised by a protein content in soluble phase below or equal to 60%, a ratio of soluble kappa-casein to total content of kappa-casein below or equal to 0.12 and a ratio of beta-lactoglobulin to total content of beta-lactoglobulin below or equal to 0.57.

What is meant by "soluble protein", "soluble kappa-casein" or yet "soluble beta-lactoglobulin" is the amount of corresponding protein in the soluble fraction of the ice confection once melted at room temperature and centrifuged at 50,000 g for 30 min using for example a Sorvall RC-5 plus centrifuge equipped with a SM 24 rotor or an equivalent device enabling to apply similar acceleration during the same time.

By "frozen aerated confectionery product" is meant any aerated product such as ice cream, sorbet or any frozen dessert etc.

The products of the invention are characterised by the presence of a partially coagulated protein system.

The term "partially coagulated protein system" is to be understood to mean a complex or an aggregate resulting from at least a partial coagulation of proteins present in the ingredient mix, for instance induced by the presence of an acid component combined with a heat treatment.

Most milk proteins (mainly caseins) in their native state remain in colloidal suspension form leading to minimal changes to mix viscosity (~200-400 cp). However, when proteins are subjected to controlled exposure to known amounts of heat and acid (e.g., pH of 6.1 or less and pasteurization) they undergo coagulation. Coagulation is a state where the proteins are hydrated resulting in a three dimensional network (soft gel) causing increased mix viscosity (~1800-2400 cp). If the exposure of proteins to heat and acid is not controlled, this phenomenon could lead to precipitation (e.g., syneresis in yogurt). In the worst case scenario, the liquid separates from the precipitate and the size of the solids decreases.

The partially coagulated protein system according to the invention is characterised by the presence of a significant particle size peak or group of particles greater than 45 μm, preferably greater than 100 μm, and lower than 300 μm. A more preferred range is 125 μm to 250 μm.

Preferably, the proteins at the origin of the partial coagulation are milk proteins usually present in the ice cream mix and comprise caseins and whey proteins.

The applicant has discovered that texture and mouthfeel of ice confections is improved as a result of an optimized process of preparation including the controlled use of heat and acidic conditions. More particularly, by manipulating the milk protein structure in an ice confection mix by decreasing the pH and exposing the mix to controlled heat, it is believed that protein denaturation and subsequent aggregation occurs as heat unfolds whey protein and acidic conditions destabilizes casein micelles. These protein aggregates form a network that is suspected of entrapping water and fat globules and increases mix viscosity to create a uniquely smooth, creamy texture that mimics the presence of higher fat levels.

The present invention thus relates in a first aspect to frozen aerated confectionery products comprising a partially coagulated protein system including kappa-casein and beta-lactoglobulin. The products of the invention are characterised by a pH comprised in a range of 5.6 to 6.3, preferably 5.8 to 6.3. Preferably, the total content of protein in the soluble fraction is below or equal to 60%, the ratio of soluble kappa-casein to total kappa-casein is below or equal to 0.12 and the ratio of soluble beta-lactoglobulin to total content of beta-lactoglobulin is below or equal 0.57 when the frozen confection is melted and centrifuged at 50,000 g for 30 min.

Figure 5:
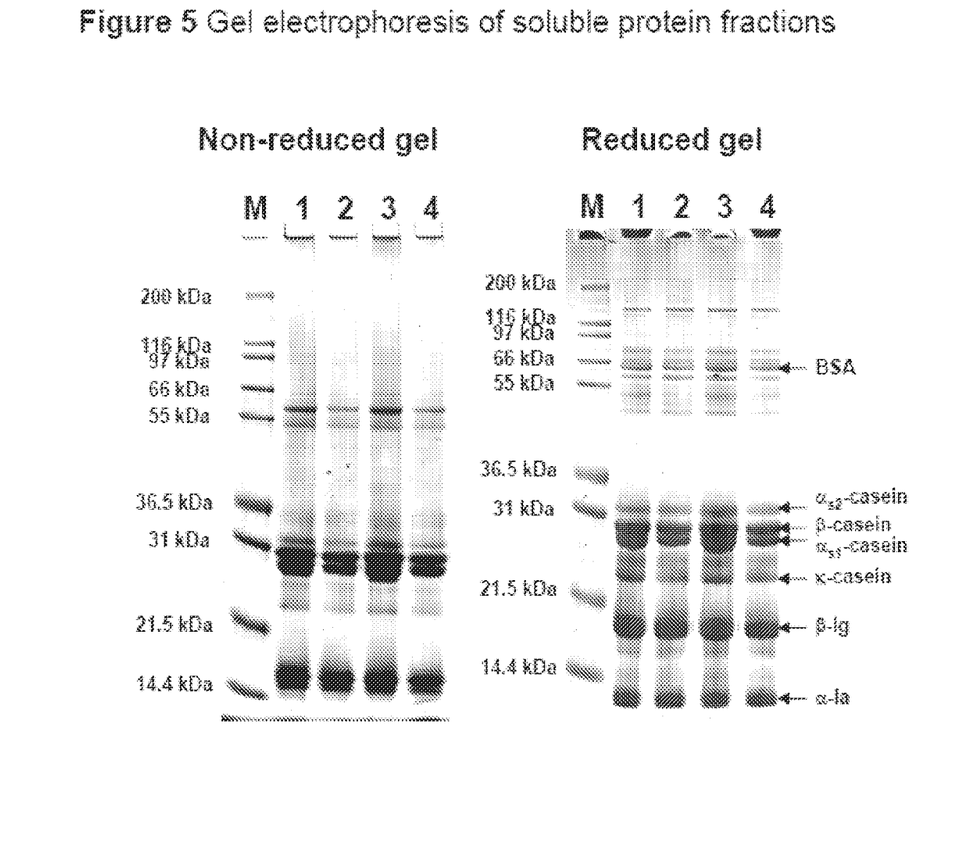
FIG. 5 is a photograph of gel electrophoresis profiles that emphasize the presence of kappa-casein/beta-lactoglobulin complexes in a product of the invention, showing soluble phase of samples from example 2 analyzed by gel electrophoresis in non-reducing and reducing respectively conditions. Lane M is for molecular weight markers (in kDa), whereas lanes 1 and 3 are for control product and lanes 2 and 4 are for product according to the invention. Lanes 1 and 2 are for standard freezing. Lane 3 and 4 are for low temperature extrusion. The protein content in the 10 microliters deposit of the gel was 2 mg·mL$^{-1}$.
Figure 6:
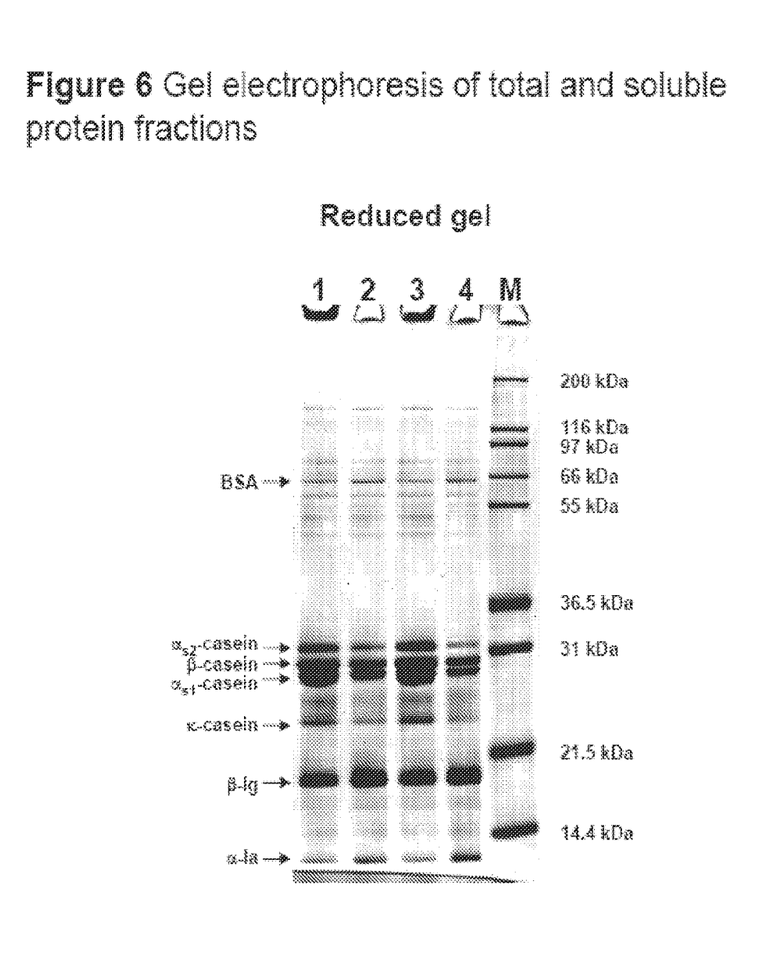
FIG. 6 is a photograph of gel electrophoresis profiles of products from example 1 obtained according to the invention after sample reduction. This gel was used to determine the content in kappa-casein and beta-lactoglobulin in the sample. Lane M is for molecular weight markers (in kDa). Lanes 1 and 3 are for total sample whereas lanes 2 and 4 are the corresponding soluble fractions. Lanes 1 and 2 correspond to standard freezing conditions. Lanes 3 and 4 correspond to low temperature extrusion. The protein content in the 10 microliters deposit of the gel was 0.5 mg·mL$^{-1}$.

The products of the invention comprise protein complexes formed between mainly beta-lactoglobulin and the kappa-casein from the surface of the casein micelles. FIG. 5 emphasizes the presence of these aggregates in gel electrophoresis profiles. The electrophoresis gels corresponding to the soluble fraction of samples from example 2 are presented on FIG. 5, showing respectively products obtained by classical freezing condition (lanes 1 and 3) or applying low temperature extrusion (lanes 2 and 4). The major milk proteins can be detected among which beta-lactoglobulin and kappa-casein. For the non-reduced samples, it can be seen that the lanes corresponding to control samples (lanes 1 and 3) exhibit a band corresponding to kappa-casein, whereas this band is significantly depleted in the lanes 2 and 4 corresponding to the products according to the invention. This means that kappa-casein is present in a larger amount in the soluble phase of the control samples compared to products of the invention. In addition, it should be noticed that a band at about 36.5 kDa is visible in all samples before reduction. After reduction, this band disappears, leading to the appearance of a clear band corresponding to beta-lactoglobulin and kappa-casein band with increased intensity in all samples. It can therefore be concluded that the process described in the invention is leading to the formation of covalent complexes (probably linked by disulphide bonds) between kappa-casein and beta-lactoglobulin and that these complexes are more numerous in the control sample (higher initial kappa-casein band density). Without being bound by theory, it is believed that casein micelles are coated with beta-lactoglobulin under the acidic conditions of our invention and are either entrapped in the fat phase or in the insoluble phase after centrifugation, leading to a depletion of the protein aggregates in the soluble phase. The soluble aggregates are mainly composed of beta-lactoglobulin and kappa-casein complexes that did not adsorb with the casein micelles to the fat droplet interface during ice cream manufacture or were not sensitive to centrifugation, but remained in the bulk phase. The partially coagulated protein system of the invention therefore consists on the one hand in casein micelles/whey protein complexes which can be defined as covalent protein aggregates formed between the kappa-casein from the surface of the casein micelles and mostly in soluble kappa-casein/beta-lactoglobulin complexes present in the frozen confection bulk. The products of the invention are characterised by a ratio of soluble kappa-casein to total amount of kappa-casein below or equal to 0.12 and a ratio of soluble beta-lactoglobulin to total content of beta-lactoglobulin below or equal to 0.57 when the products are melted and centrifuged at 50,000 g for 30 min.

The amount of kappa-casein and beta-lactoglobulin can be measured from Coomassie Blue gel electrophoresis analysis. The content of these two proteins can be determined from analysis of the intensity of the corresponding migration bands on reduced electrophoresis Nu-PAGE gels.

Method:

For total sample, an aliquot of 10 g of melted ice cream was dispersed in 90 g of a deflocculating aqueous solution at pH 9.5 containing 0.4% EDTA and 0.1% Tween 20. The soluble phase was obtained by centrifugation of the melted ice cream at 50,000 g for 30 min. Samples were then analyzed by gel electrophoresis on Nu-PAGE 12% Bis-Tris using the MOPS running buffer in reducing and non-reducing conditions (reducing conditions should break any covalent bound involving SH/SS exchange during heating) as described in "Invitrogen Nu-PAGE pre-cast gels instructions" (5791 Van Allen Way, Carlsbad, Calif. 2008, USA). Gels were stained with Coomassie blue (Invitrogen kit no. LC6025). The total sample and the corresponding soluble phase were deposited on the same electrophoresis gel at a concentration of 0.5 mg·mL$^{-1}$. After migration and staining with colloidal blue, the gels were scanned in 256 gray levels with a resolution of 1000 dpi using a UMAX scanner coupled with the MagicScan 32 V4.6 software (UMAX Data Systems, Inc.) leading to pictures having a size of 16 MB. These pictures were then analyzed using the TotalLab TL120 v2008.01 image analysis software (Nonlinear Dynamics Ltd, Cuthbert House, All Saints, Newcastle upon Tyne, NE1 2ET, UK). Migration lanes were detected automatically by the software. Then, image was corrected for background using the "rolling ball" option with a radius of 200. Protein bands corresponding to bovine serum albumin (BSA), β-casein, αs1- and αs2-casein, κ-casein, β-lactoglobulin (β-lg) and α-lactalbumin (α-la) were detected manually using the migration bands from a skimmed milk as a standard. The intensity of the bands was converted into peak migration profiles for each migration lane for the total sample and the soluble phase. These peaks were then fitted with a Gaussian model in order to calculate their area for each protein, and thereby the concentration of the protein in the sample.

The peak area determined for a protein in the soluble phase was thereafter corrected by the effective protein content determined by the Kjeldahl method (described thereafter) and normalised by the peak area of the corresponding protein in the total sample, leading to soluble β-lactoglobulin and κ-casein ratios that are specific to the products obtained according to the invention.

The invention is also characterised by the fact that when melted and centrifuged at 50,000 g for 30 min, the ratio of soluble protein to total protein is below 60%.

The amount of proteins present in the soluble phase after centrifugation can be measured by Kjeldahl method using a conversion factor of 6.38 for milk proteins.

Kjeldahl Method:

Kjeldahl is a general method allowing the determination of total nitrogen, using a block-digestion apparatus and automated steam distillation unit.

This method is applicable to a wide range of products, including dairy products, cereals, confectionary, meat products, pet food, as well as ingredients containing low levels of protein, such as starches. Nitrogen from nitrates and nitrites is not determined with this method.

This method correspond to the following official methods: ISO 8968-1/IDF 20-1 (milk), AOAC 991.20 (milk), AOAC 979.09 (grains), AOAC 981.10 (meat), AOAC 976.05 (animal feed and pet food), with small modifications (adaptation of catalyst quantity and sulphuric acid volume for digestion, and adaptation of boric acid concentration for automated system).

Principle of the method: Rapid mineralisation of the sample at about 370° C. with sulfuric acid and Missouri catalyst, a mixture of copper, sodium and/or potassium sulfate, which transforms organically bound nitrogen to ammonium sulfate. Release of ammonia by addition of sodium hydroxide. Steam distillation and collection of the distillate in boric acid solution. Acidimetric titration of ammonium.

Apparatus: Mineralisation and distillation unit in combination with a titration unit.

Manual, semi-automated and automated conformations are possible.

These methods are known from a skilled person in the art of frozen confectionery who has a good knowledge of proteins.

The products of the invention have a pH comprised between 5.6 and 6.3, preferably between 5.8 and 6.3. When the protein system is essentially completely coagulated prior to addition to the other components, the pH can be as high as about 6.3 without detracting from the organoleptic properties of the product.

According to a particular embodiment, the pH is controlled by the presence of an acidic component. The acid component is preferably selected from the group consisting of molasses, an organic acid such as citric acid, fruit derived acids and fermentation derived acids.

The products may be aerated to an overrun of at least 20%, preferably at least 40% and more preferably at least 90%. In a most preferred embodiment, the overrun is 100-120%.

According to a particular embodiment, the product according to the invention comprises 0-20% fat, 5-15% milk solids non fat (MSNF) and 5-30%, preferably 15-25%, of a sweetening agent. Preferably, it comprises 0 to 12% and more preferably 0.5-5.5% fat which is representative of a low-fat or non-fat product, and a natural stabilizer in an amount of 0 to 6%.

By "sweetening agent" it is to be understood a mixture of ingredients which imparts sweetness to the final product. These include natural sugars like cane sugar, beet sugar, molasses, other plant derived nutritive sweeteners, and non-nutritive high intensity sweeteners.

The reduction of fat in frozen confectioneries without compromising the indulgent quality of the product is one of the main challenges faced by the industry. The present invention is overcoming this issue in providing low fat or even non-fat products with similar texture and sensory attributes than those having higher fat contents in terms of creaminess and flavour delivery.

Furthermore, the benefit of the system according to the invention extends to other parts of the cold-chain distribution of such products, in that products which have gone through typical heat shock or distribution abuse maintain the smooth, creamy texture longer than other products that are subjected to the same treatment.

According to a specific embodiment, the product of the invention essentially consists in natural ingredients.

By "natural ingredients" what is meant are ingredients of natural origin. These include ingredients which come directly from the field, animals, etc. or which are the result of a physical or microbiological/enzymatic transformation process. These therefore do not include ingredients which are the result of a chemical modification process.

Examples of non-natural ingredients which are avoided in this particular embodiment of the invention include for example mono- and diglycerides of fatty acids, acid esters of mono- and diglycerides of fatty acids such as acetic, lactic, citric, tartaric, mono- and diacetyl tartaric acid esters of mono- and diglycerides of fatty acids, mixed acetic and tartaric acid esters of mono- and diglycerides of fatty acids, sucrose esters of fatty acids, polyglycerol esters of fatty acids, polyglycerol polyricinoleate, polyethylene sorbitan mono-oleate, polysorbate 80, chemically extracted lecithin.

Chemically modified starches which are used in the art as stabilisers are also preferably avoided. These include for example oxidised starch, monostarch phosphate, distarch phosphate, phosphated or acetylated distarch phosphate, acetylated starch, acetylated distarch afipate, hydroxy propyl starch, hydroxypropyl distarch phosphate, acetylated oxidised starch.

The products of the invention are preferably essentially free of the preceding synthetic esters and modified starches. "Essentially free" means that these materials are not intentionally added for their conventional property imparting abilities, e.g., stabilizing, although there could be unintended minor amounts present without detracting from the performance of the products. Generally and preferably, the products of the invention will not contain any non-natural materials.

The products may thus include a natural stabilizer system such as those described in application EP 08171666.4, the entire content of which is expressly incorporated herein by reference thereto.

By "stabiliser system" is to be understood a mixture of ingredients which contributes to the stability of the frozen product with respect to ice crystal formation, heat shock resistance, overall texture properties etc. Thus, the stabiliser system may comprise any ingredients which are of structural importance to the frozen confectionery.

The stabiliser system used in the present products preferably comprises at least one natural emulsifier.

Natural emulsifiers include for example egg yolk, buttermilk, raw acacia gum, rice bran extract or mixtures thereof. The natural emulsifiers have the advantage of conferring to the finished product a smoother texture and stiffer body which reduce the whipping time. The presence of natural emulsifiers results in air cells that are smaller and more evenly distributed throughout the internal structure of the ice cream. Preferably, the natural emulsifier used in the present stabiliser system is egg yolk. A typical range for this component is about 0.5 to 1.4% of solids from egg yolk.

According to another particular embodiment, the stabiliser system used in the products of the invention comprises at least one non-natural emulsifier. Any food grade emulsifier typically used in ice confection could be used. suitable emulsifiers include sugar esters, emulsifying waxes such as beeswax, carnauba wax, candedilla wax, plant or fruit waxes and animal waxes, polyglycerol fatty acid esters, polyglycerol polyricinoleate (PGPR), polysorbates (polyoxyethylene sorbitan esters), monoglycerides, diglycerides, lecithin and mixtures thereof.

The product may additionally comprise flavourings or colourings. Such flavourings or colourings, when used, are preferably selected from natural ingredients. These are used in conventional amounts which can be optimized by routine testing for any particular product formulation.

The frozen aerated confectionery products as defined above can be produced by conventional freezing or by low-temperature extrusion.

A low temperature extruded frozen confectionery comprising the partially coagulated system defined above is thus another object of the present invention. This step of low-temperature extrusion or low-temperature freezing may be carried out in a single or twin screw extruder.

Low-temperature extrusion is a known process which imparts to the final product a specific and advantageous microstructure. For instance, ice crystal size and air bubble size tend to be smaller than in traditional manufacturing processes. On the other hand, the size of fat globules does not change significantly when LTE process is used.

When low temperature extruded, the products of the invention surprisingly present improved characteristics in terms of their microstructure compared to known low temperature extruded products.

Products obtained by low temperature freezing are described in US 2007/0196553, the content of which is here-included by reference. For instance, ice crystal size and air bubble size tend to be smaller than in traditional manufacturing processes. Ice crystals, air cells, fat globules and agglomerates thereof shall be in a specific diameter range in order to enhance positive sensory and stability characteristics. Typically at least 50% in number of ice crystals/ice crystal agglomerates preferably in a size range between 5 and 30 microns (or mean value below 8-10 microns) together with a low degree of ice crystal interconnectivity improve scoop ability and creaminess. At least 50% in number of air cells preferably in the diameter range between 2-10 microns (or mean value below 8-10 microns) delays bubble coarsening by coalescence during melting in the mouth so strongly, that creaminess sensation is significantly enhanced. The volume-averaged size distribution of fat globules/fat globules agglomerates preferably exhibits a peak in the size range between 2-20 microns. This size distribution represents the relative volume of fat globules of each specified diameter and has a significant direct impact on improving creaminess sensation in the mouth and also contributes to increased air cell structure stability against coalescence thus supporting also indirectly the creaminess attribute. These size measurements can be carried out by methods known to the skilled person. For instance, ice crystal size and air bubble size can be measured using optical microscopy and fat particle size analysis can be carried out by laser light scattering.

The low-temperature extruded frozen aerated confectionery products of the invention have a smoother mouthfeel and particularly appealing textural and organoleptic properties, compared to low temperature extruded products known to date.

In terms of microstructure, the products of the invention can be characterised by an averaged equivalent diameter ($D_{21}$) of fat globule or fat globule agglomerates below 10 microns when quantitatively analysed in fluorescence microscopy of resin sections of cryo-fixed (−20° C.) and resin cryo-infiltrated (−20° C.) ice creams at a magnification of ×1440. Therefore, compared to a standard LTF process, the combination of LTF with controlled heat and acidic conditions according to the invention leads to an intermediate size of fat globules.

Therefore, it has been surprisingly found out that the presence of this partially coagulated protein system in a low temperature extruded product tremendously improves the sensory profile of the product and in particular that it enhances considerably the smooth and creamy texture of frozen confectioneries that contain this system.

Figure 1:
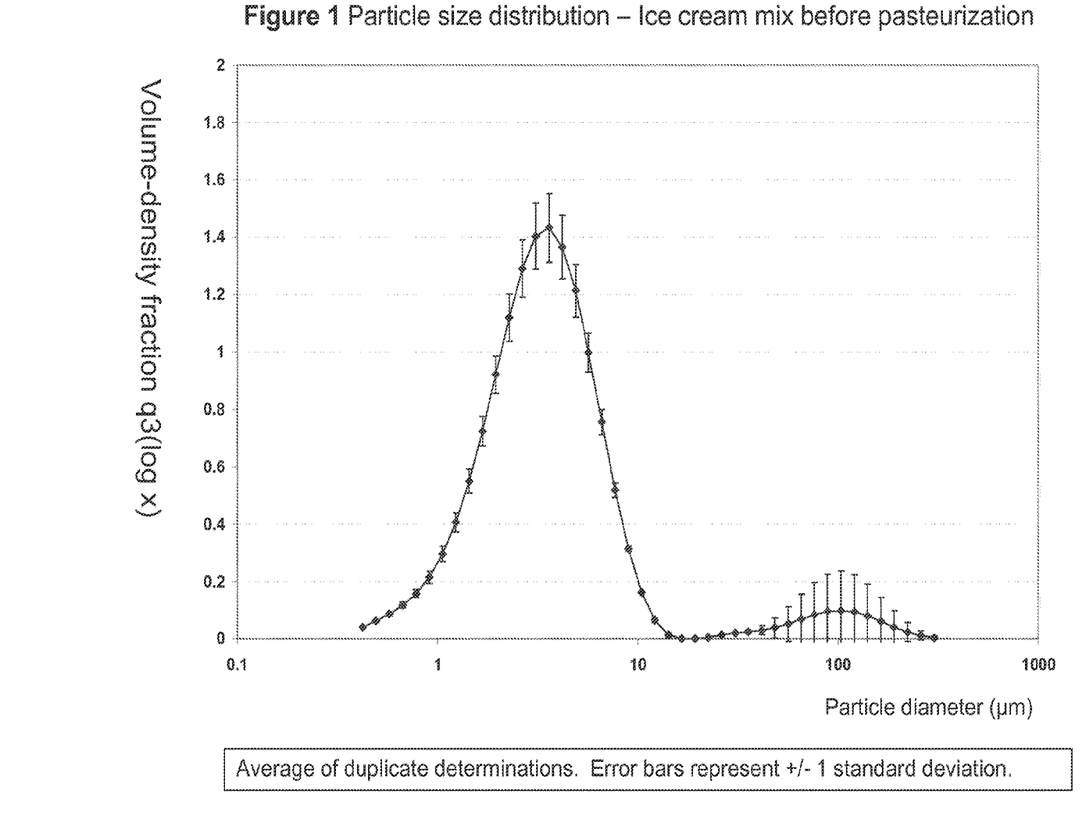
Figure 2:
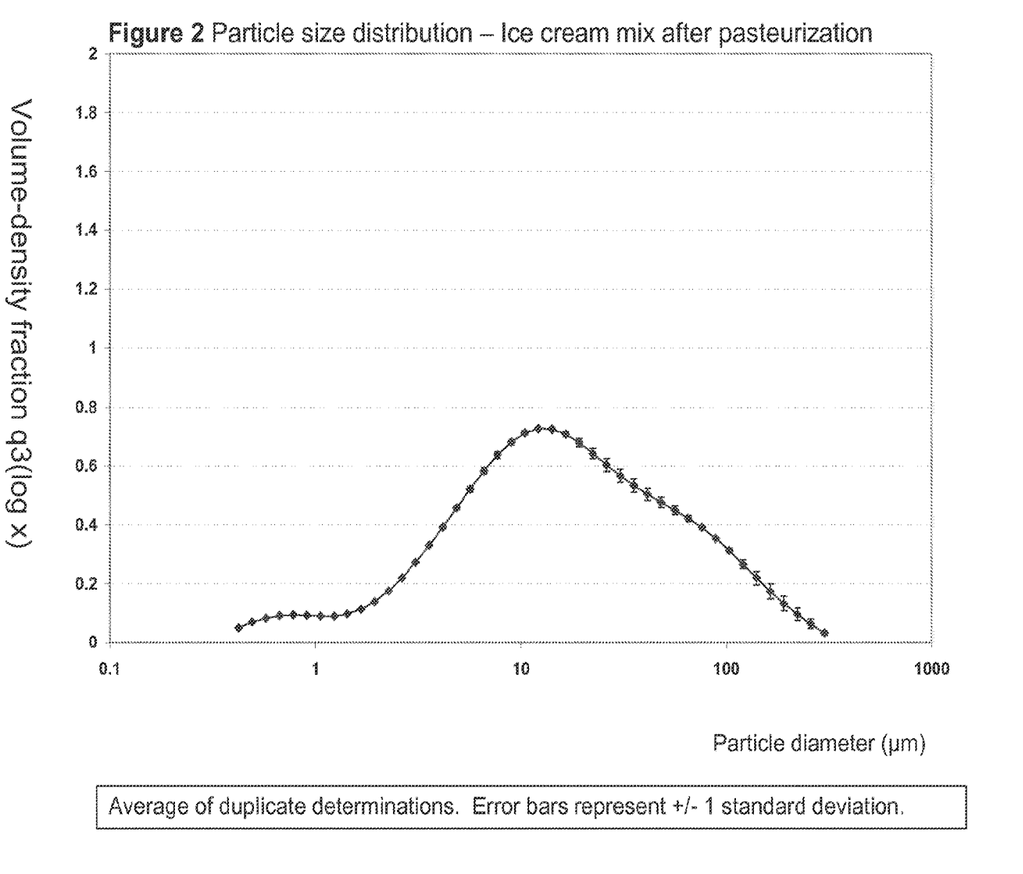
Figure 3:
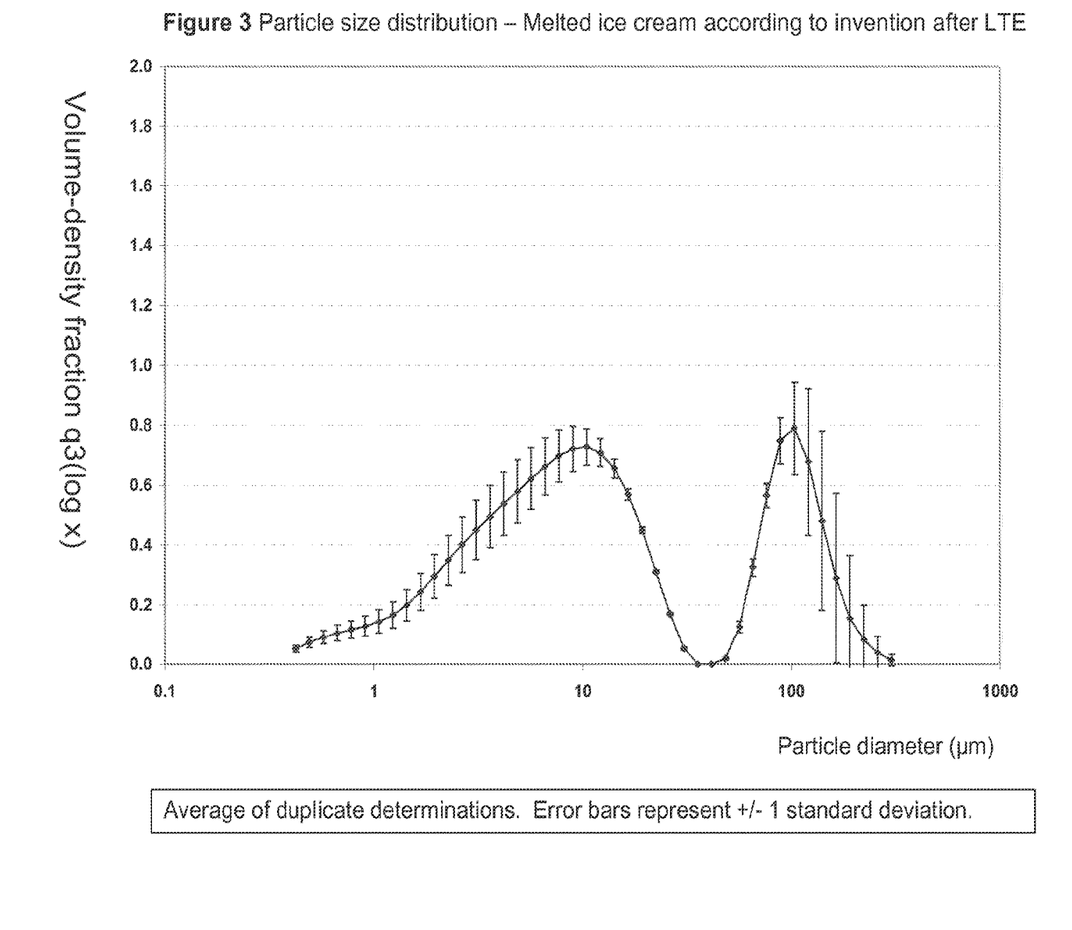
Figure 4:
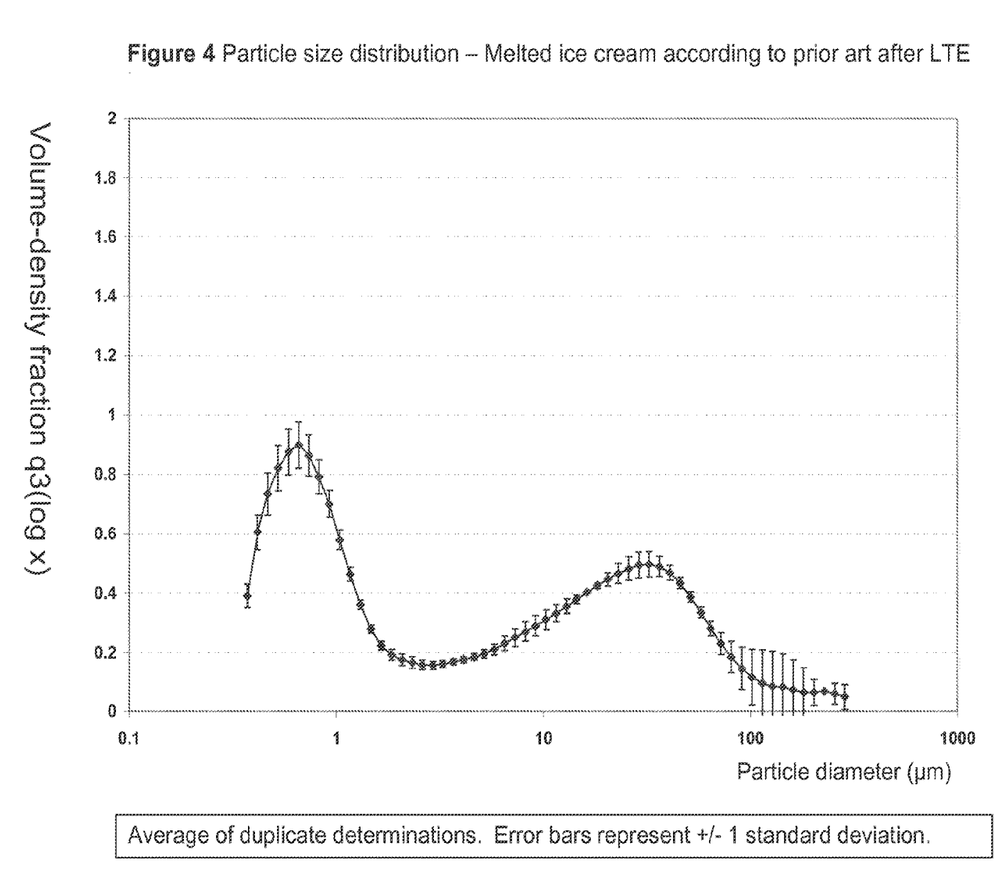

The following data is submitted to show the difference in particle size for the partially coagulated protein systems of the present invention. FIG. 1 shows the particle size of a formulation such as that disclosed in Table 4 of Example 4 herein that does not contain coagulated proteins while FIG. 2 shows the same formulation after a heat treatment (at 178° F.-190° F. for 30-90 sec) which causes partial coagulation of the proteins in the formulation. A comparison of these two graphs shows that the particle size of the formulation according to the invention is larger, i.e., more that 10 μm, while the non-heat treated formulation is around 4 μm. Furthermore, the volume density of the heat treated formulation is reduced to a maximum of 7.5 μm whereas the non heat treated formulation is as high as 1.5 μm. Thus, the present coagulation treatment creates a three dimensional network that has the ability to have increased water binding capacity and results in an improvement of sensory attributes relating to texture and flavour. Similarly, a comparison of FIGS. 3 and 4 shows that the coagulated system of FIG. 3 exhibits similar enhancements in particle size and volume density for a low temperature extruded product containing a partially coagulated protein system compared to a low temperature extruded product containing non coagulated protein. These enhancements are attributable to the three dimensional network of the coagulated proteins and directly lead to the texture and flavour of the final product.

This effect is even more surprising given that it is known from the art that protein coagulation has a negative impact on the organoleptic characteristics of ice cream products. In this regard, EP 1 342 418 teaches a method for preparing a frozen ice cream containing an acid component but ensuring that at least one protein does not react with the acid. According to this teaching, the contact time between the acid and the protein should be kept to a minimum.

In contrast, the present invention is directed to a partially coagulated protein system produced by a reaction between an acidic environment and proteins such as milk proteins, which has shown to considerably improve the texture of frozen confections prepared either by conventional freezing or by low temperature freezing.

When conventional freezing is used, the partial coagulation obtained by controlled application of heat and acidic conditions to the mix results in exceptional sensory attributes which are comparable to those obtained by low temperature extrusion without such partial coagulation.

On the other hand, when low temperature extrusion is used, the combination of partial coagulation of proteins during mix processing and low temperature extrusion ("LTF") technology, allows the creation of very high quality frozen confectionery with a minimum of fat and fewer ingredients. While the use of low temperature extrusion to manufacture low fat ice cream has been widely practiced, the invention now creates a significantly superior product and hence unique advantage for the consumer.

Furthermore, the product of the invention has proven to be particularly stable, both when frozen as well as when dispensed at room temperature for consumption.

Without being bound by theory, it is believed that partial coagulation of proteins within the ice cream mix is providing freshly coagulated protein that act as a natural stabilizer for the air cells and enable creation of a very fine and stable microstructure resulting in a smooth, rich and creamy product without the use of artificial or non-natural stabilizers or similar additives. This makes the products more natural and desirable for consumers who wish to minimize their intake of such artificial or non-natural additives.

In particular, the synergistic effect of the freshly coagulated proteins in the amounts used when combined with the LTF technology is therefore leading to superior products in terms of texture and stability.

The invention relates in a further aspect to the use of a partially coagulated protein system including kappa-casein and beta-lactoglobulin for manufacturing a frozen confectionery product with a pH comprised between 5.6 and 6.3, preferably between 5.8 and 6.3, via conventional freezing or low temperature freezing.

Such a system offers the unexpected advantage that it can confer to the frozen confectionery product exceptional sensory attributes with good stability while minimizing the fat content.

Preferably the partially coagulated system comprises complexes of beta-lactoglobulin and kappa-casein from the surface of casein micelles which have a particle size of 45 μm, preferably greater than 100 μm, and lower than 300 μm, e.g. 125 μm to 250 μm.

A method for producing the products of the invention also forms part of the invention, and more particularly a method of producing an aerated frozen confectionery product comprising proteins which are freshly partially coagulated within the ice cream mix which is further homogenised, pasteurised and conventionally frozen or subjected to low temperature extrusion.

According to a particular embodiment, the method comprises as a first step providing an ingredient mix with a pH comprised between 5.6 and 6.3, preferably between 5.8 and 6.3 comprising fat, preferably in an amount of 0-20%, milk solids non-fat, preferably in an amount of 5-15%, sweetening agent, preferably in an amount of 5-30%, a natural stabiliser system, preferably in an amount of 0 to 6%, and optionally an acidic component. It is noted that the pH measured at that stage is significantly the same as the pH of the final product. The mix is then homogenized and pasteurized to temperature preferably comprised between 178° F. and 190° F. for 30 to 90 s. The partial coagulation results from the combination of controlled acid and heat in the presence of proteins.

The process of the invention has surprisingly proven to enhance the textural experience of frozen dairy systems even at lower fat and calorie levels. The applicant has discovered that the controlled reduction of the pH of the mix before processing combined with an optimized mix parameters results in a product with smooth, creamy texture and superior flavour release when compared to typical low temperature extruded products. Without being bound by theory, it is believed that during the process, protein structure changes as heat unfolds whey proteins and acidic conditions destabilize casein micelles. The modified protein forms a controlled network that binds water and fat globules while increasing mix viscosity to create a uniquely smooth and creamy texture that mimics the sensory attributes at higher fat products.

This effect is not observed when for example whey protein is denaturated and further added to an ice cream mix as disclosed in the prior art. It has been measured by the applicant that in such a case, whey proteins remain mostly in the soluble phase. In this case, the ratios of soluble kappa-casein to total content of kappa-casein and beta-lactoglobulin to total content of beta-lactoglobulin are not in the claimed ranges of the invention.

According to a particular embodiment, the ice confection mix comprises an acidic component. Preferably the acid component is selected from the group consisting of molasses, an organic acid such as citric acid, other fruit derived acids and fermentation derived acids.

Pasteurization is performed under standard conditions and may be carried out prior to or after homogenisation. Preferred pasteurisation conditions include heating to about 80° to 90° C. (178 to 190° F.) for 30 to 90 s.

Homogenisation can be done either prior or after pasteurization. It is preferably carried out under standard conditions, namely at a pressure of between 40 and 200 bars, preferably between 100 and 150 bars, more preferably between 120 and 140 bars.

The homogenised mix may then be cooled to around 2 to 8° C. by known means. The mix may further be aged for 4 to 72 h at around 2 to 6° C. with or without stirring. Optionally, the addition of flavourings, colourings, sauces, inclusions etc. may be carried out prior to the ageing step. If flavourings, colourings, sauces, inclusions etc. are added, these are preferably selected from natural ingredients only.

In the next step, the mix is aerated. In a preferred embodiment, the mix may be cooled to a temperature below −3° C., preferably between −3 and −10° C., preferably at about −4.5 to −8° C. with stirring and injection of gas to create the desired overrun.

The frozen confectionery is preferably aerated to an overrun of at least 20%, preferably at least 40%, more preferably at least 90%. The overrun is preferably up to 150%. Most preferably, the overrun is comprised between 100-120%.

The aerated mix is then subjected to freezing either by using conventional freezing equipment or by a low temperature extrusion system. In this equipment, the aerated mix is cooled by extrusion at a temperature of below −11° C., preferably between −12° C. and −18° C. in a screw extruder. The screw extruder may be such as that described in WO 2005/070225. The extrusion may be performed in a single or twin screw extruder.

The frozen mix is then packaged and stored at temperatures below −20° C., where it will undergo hardening step during storage. Alternatively, it can be hardened by accelerated hardening step, for example via a hardening tunnel, carried out at a temperature between −20° C. to −40° C. for a sufficient time to harden the product.

The method of the invention lends itself to the manufacture of frozen confectioneries which are shelf-life stable at the necessary storage temperatures and have superior organoleptic and textural properties.

The frozen aerated confectionery products obtainable by the present method also form part of the invention. Such products comprise 0-20% fat, 5-15% MSNF, 5-30%, preferably 15-25%, of a sweetening agent, 0 to 12% and more preferably 1-5.5% fat, and a natural stabilizer in an amount of 0 to 6%.

Thus, the present invention proposes a new way in which a low fat, preferably natural frozen confectionery product which is stable and with superior sensory attributes may be manufactured.

EXAMPLES

The present invention is illustrated further herein by the following non-limiting examples.

Example 1

Low Fat Frozen Dairy Dessert Containing 3% Fat

TABLE 1

| Ingredient | Wt % of final product |
| --- | --- |
| Fat | 3 |
| Sugar | 20-22 |
| MSNF | 10.3 |
| Emulsifier | 0.1-0.35 |

In a first variable, referred to as "Control 1", conventional mix-making procedures were followed to yield to a 3.0% fat and 10.3% MSNF mix. The measured pH of the mix was 6.38 before pasteurization. No other acidulants were added to the mix. The mix was then processed between 178 to 190° F. for 30 to 90 sec.

In a second variable a similar mix with 3.0% by weight fat and 10.3% MSNF was tested following a controlled reduction in pH. A citric acid solution was used to lower the pH value to 5.98 before pasteurization. The mix was then processed, between 178 and 190° F. for 30 to 90 sec.

The two variables were frozen on a conventional freezer alone and Control 1 was also processed by a combination of conventional freezer and low temperature freezing and samples were collected at both freezer outlets.

The product made with controlled reduction in pH was significantly smoother compared to "Control 1" prepared via conventional freezing and provided superior heat shock resistance to the product.

The noticeable enhanced smooth and creamy texture of the second variable was comparable to the control when the latter was processed via conventional freezing followed by low temperature extrusion. The flavour delivery was superior when compared to product made without the novel process, indicating that the flavour is not bound by the protein matrix but is released better during consumption.

Example 2

Low Fat Frozen Dairy Dessert Containing 5.5% Fat

TABLE 2

| Ingredient | Wt % of final product |
| --- | --- |
| Fat | 5.5 |
| Sugar | 20-22 |
| MSNF | 10.9 |
| Natural emulsifier | 0.1-0.35 |

In a first variable, the pH of the mix was reduced to 5.94 before pasteurization by use of acidulants. Natural stabilizer system including an emulsifier was used. The mix was then pasteurized between 178 to 190° F. for 30-90 Sec.

In a second variable—referred to as "Control 2", a similar mix composition was used except that there was no reduction in pH through acidulants. The pH of the mix before pasteurization was measured at 6.41. It was also standardized to 5.5% fat and 10.9% MSNF. Natural stabilizer system including an emulsifier was used. The mix was pasteurized between 178 to 190° F. for 30-90 Sec.

The two variables were frozen on a conventional freezer alone and Control 2 was also processed by a combination of conventional freezer and low temperature freezing and samples were collected at both freezer outlets.

The resultant product made by controlled heat and acid-induced coagulation was observed to have superior textural attributes than Control 2 when the latter was processed by conventional freezing and comparable to Control 2 when the latter was processed by low temperature extrusion.

Example 3

Ice Cream with 11.0% Fat Prepared Using Conventional Freezing

TABLE 3

| Ingredient | Wt % of final product |
| --- | --- |
| Fat | 11 |
| Sugar | 19-20 |
| MSNF | 10.9 |
| Natural emulsifier | 0.1-0.35 |

In a first variable (referred to as "Control 3") a mix was made using conventional mix making procedure and standardized to 11% fat & approximately 11% MSNF.

In a second variable, a similar mix composition was used and the pH was reduced to 5.90 using acidulants.

Both mixes were frozen using standard single barrel freezer. When compared for sensorial attributes, the second variable was found to have better body and texture as well as superior flavour release than "Control 3".

Example 4

Frozen Confections Prepared by Low Temperature Extrusion

The following confectioneries were prepared:

TABLE 4

| Ingredient | Wt % of final product |
| --- | --- |
| Fat | 11-13 |
| Sugar | 10-11 |
| MSNF | 9-10 |
| Natural emulsifier | 4-5 |
| Acidulants | 0.1-10 |
| Total solids | 44-45 |

Sample A:

Conventional mix-making procedures were followed to yield a 12.5% fat and 9.5% MSNF mix. Sugar and acidulants were combined via standard pre-pasteurization mix-making methods The mix was then pre-heated for homogenization and homogenized. It was then pasteurized between 178-190° F. for 30-90 seconds.

Sample B (Comparative):

Fat, milk solids non fat, and emulsifier mentioned in Table 1 were homogenized and further pasteurized under similar conditions as sample A.

Separately a mix comprising sugar and acidulants was prepared and pasteurized under similar conditions as sample A. These two separately pasteurized components were brought together before aging of the mix.

Samples A and B were then respectively frozen according to the following process:

Ageing at 3° C. for 6 hours. The mix was then aerated to an overrun of between 20 and 40% and frozen to a temperature of −6° C. at the exit of a conventional ice cream freezer. The aerated and partially frozen mix was then transferred to a twin screw extruder where it was cooled to a temperature below −11° C. at the exit. The extruded product was then packaged and hardened at −35° C. Finally, the product was stored at −25° C.

Upon evaluation of samples A and B, the products were found to be significantly different in terms of texture (smoothness and creaminess). Sample A, wherein the acid component has been in contact with the proteins followed by a heat treatment (pasteurization) was significantly smoother, creamier and with the characteristic "velvety" texture in contrast with comparative sample B wherein partial coagulation did not occur since the acid component was not present in the mix during heating.

Example 5

Product Comparisons

Product formulations of Example 4 were subjected to 5 weeks of heat shock stability testing and Table 5 present the sensory results when compared to their un-abused or un-coagulated control products.

Heat shock: the samples initially stored at −30° C. were kept for 5 weeks at −12° C.

TABLE 5

| Product | Texture | Flavor | Appearance | Overall |
| --- | --- | --- | --- | --- |
| Control (Ex 4B) | Lost creaminess and became colder and icy | No marked changes | Became darker in color more than the test sample | Cold and icy product in texture and good flavor |

TABLE 5-continued

| Product | Texture | Flavor | Appearance | Overall |
|---|---|---|---|---|
| (Invention Ex 4A) | Maintained excellent Creaminess; Still maintained smooth and velvety texture | No Marked flavor changes | Slight darkening of color | Good product, no marked changes after 5 week heat shock test |

The invention is claimed as follows:

1. A frozen aerated confectionery product comprising a partially coagulated protein system comprising protein aggregates comprising kappa-casein and beta-lactoglobulin, the protein aggregates having a particle size greater than 45 μm and lower than 300 μm,
wherein the protein aggregates are produced by homogenizing a composition at a pressure between 100 and 150 bars, the composition comprising milk solids non-fat and having a pH between 5.6 and 6.3 when measured at 25° C., and then pasteurizing the homogenized composition at a temperature between 178° F. and 190° F. for 30 to 90 seconds, the composition is not further homogenized after the pasteurizing.

2. The product of claim 1 wherein, when melted and centrifuged at 50,000 g for 30 min, the content of soluble protein is not greater than 60%, the ratio of soluble kappa-casein to total content of kappa-casein is not greater than 0.12 and the ratio of soluble beta-lactoglobulin to total content of beta-lactoglobulin is not greater than 0.57.

3. The product of claim 1, comprising 0-20% by weight of fat, 5-15% by weight of the milk solids non-fat, 5-30% by weight of sweetening agent, and 0 to 6% by weight of a stabiliser system comprising an emulsifier.

4. The product of claim 3, comprising 0.5 to 1.4% by weight of egg yolk solids.

5. The product of claim 1, having an overrun of at least 20%.

6. The product of claim 4, wherein the product is essentially free of any artificial or non-natural emulsifier, and the protein aggregates and the egg yolk solids are the only emulsifier in the product.

7. A method of producing an aerated frozen confectionery product, the method comprising:
providing an ingredient mix having a pH between 5.6 and 6.3 when measured at 25° C. and comprising milk solids non-fat;
homogenizing the ingredient mix at a pressure between 100 and 150 bars;
after the homogenizing, pasteurizing the ingredient mix at a temperature between 178° F. and 190° F. for 30 to 90 seconds, the pasteurizing of the ingredient mix produces a partially coagulated protein system comprising protein aggregates comprising kappa-casein and beta-lactoglobulin and having a particle size greater than 45 μm and lower than 300 μm, the ingredient mix is not further homogenized after the pasteurizing; and
freezing while aerating the pasteurized homogenized mix.

8. The method of claim 7, wherein the ingredient mix comprises an acidic component selected from the group consisting of liquid molasses, an organic acid, and part of a fermented base.

9. The method of claim 7, wherein the pasteurized homogenized mix is aerated to an overrun of at least 20%.

10. The method of claim 7, comprising a dynamic cooling of the frozen aerated mix to a temperature below −11° C. in a single or twin screw extruder.

11. The method of claim 7 comprising hardening the frozen aerated mix at a temperature below −20° C.

12. The method of claim 7, wherein the ingredient mix comprises 0-20% by weight of fat, 5-15% by weight of the milk solids non-fat, 5-30% by weight of a sweetening agent, and 0 to 6% by weight of a stabilizer system comprising an emulsifier.

13. The method of claim 12, wherein the ingredient mix comprises 0.5 to 1.4% by weight of egg yolk solids.

14. The method of claim 13, wherein the ingredient mix is essentially free of any artificial or non-natural emulsifier, and the protein aggregates and the egg yolk solids are the only emulsifier in the product.

15. The method of claim 7, wherein the pH of the ingredient mix is between 5.8 and 6.3 when pasteurized.

16. The method of claim 7, wherein the pasteurizing is performed at a temperature between 178° F. and 190° F. for a time from 30 to 90 seconds.

17. The method of claim 7, wherein the frozen aerated mix has a pH that is about the same as the pH of the ingredient mix.

18. The method of claim 7, wherein the homogenizing is performed at a pressure between 120 and 140 bars.

19. The product of claim 1, wherein fat is 1.0-5.5 wt. % of the product.

20. A frozen aerated confectionery product comprising a partially coagulated protein system comprising protein aggregates comprising kappa-casein and beta-lactoglobulin, the protein aggregates having a particle size greater than 45 μm and lower than 300 μm, the product having a pH between 5.6 and 6.3 when measured at 25° C.,
wherein, when the product is melted and centrifuged at 50,000 g for 30 min, the content of soluble protein is not greater than 60%, the ratio of soluble kappa-casein to total content of kappa-casein is not greater than 0.12, and the ratio of soluble beta-lactoglobulin to total content of beta-lactoglobulin is not greater than 0.57,
wherein the protein aggregates are produced by homogenizing an ingredient mix at a pressure between 100 and 150 bars, the ingredient mix comprising milk solids non-fat and having a pH between 5.6 and 6.3 when measured at 25° C., and then pasteurizing the homogenized ingredient mix at a temperature between 178° F. and 190° F. for 30 to 90 seconds, the ingredient mix is not further homogenized after the pasteurizing.

* * * * *